(12) United States Patent
Heck et al.

(10) Patent No.: US 7,703,590 B2
(45) Date of Patent: Apr. 27, 2010

(54) TORQUE CONVERTER WITH TURBINE ONE-WAY CLUTCH

(75) Inventors: Thomas Heck, Wooster, OH (US); Kevin Parks, Wooster, OH (US)

(73) Assignee: LuK Lamellen und Kupplungsbau Beteiligungs KG, Buehl (DE)

(*) Notice: Subject to any disclaimer, the term of this patent is extended or adjusted under 35 U.S.C. 154(b) by 395 days.

(21) Appl. No.: 11/789,294

(22) Filed: Apr. 24, 2007

(65) Prior Publication Data

US 2007/0251789 A1 Nov. 1, 2007

Related U.S. Application Data

(60) Provisional application No. 60/796,477, filed on May 1, 2006.

(51) Int. Cl.
*F16H 45/02* (2006.01)
(52) U.S. Cl. .................... 192/3.25; 60/345; 192/3.29; 192/46
(58) Field of Classification Search ................ 192/3.25, 192/3.26, 3.27; 60/341, 345
See application file for complete search history.

(56) References Cited

U.S. PATENT DOCUMENTS

| | | | |
|---|---|---|---|
| 4,413,535 A | 11/1983 | Hobbs | |
| 4,493,402 A | 1/1985 | Hattori | |
| 4,919,009 A | 4/1990 | Newman et al. | |
| 5,713,442 A | 2/1998 | Murata et al. | |
| 6,079,529 A * | 6/2000 | Hinkel et al. | 192/3.26 |
| 6,907,971 B2 * | 6/2005 | Demir et al. | 192/46 |
| 2005/0000481 A1 * | 1/2005 | Asakawa et al. | 123/179.16 |
| 2007/0045076 A1 | 3/2007 | Brees et al. | |

FOREIGN PATENT DOCUMENTS

| | | |
|---|---|---|
| DE | 19950988 | 4/2001 |
| GB | 2153023 A | 8/1985 |
| JP | 2004-122879 | 4/2004 |

OTHER PUBLICATIONS

U.S. Appl. No. 11/793,316, filed Apr. 27, 2007.

* cited by examiner

*Primary Examiner*—Rodney H Bonck
(74) *Attorney, Agent, or Firm*—Simpson & Simpson, PLLC

(57) ABSTRACT

The present invention broadly comprises a torque converter including a turbine and a one-way clutch rotationally connected to said turbine and an output hub for said converter. The one-way clutch rotationally disconnects the hub and the turbine when the hub receives torque from an input transmission shaft. In some aspects, the one-way clutch is a ratchet clutch. The converter can include a torque converter clutch to lock a cover and the turbine. In some aspects, the converter includes a torque converter clutch to connect a cover, the one-way clutch, and the hub and the torque converter clutch transmits torque from the hub to the cover to start a drive unit connected to the cover. The converter can include a damper element rotationally connected to the torque converter clutch and the turbine, one-way clutch, or hub. The one-way clutch is rated to operate under multiplied drive unit torque.

16 Claims, 3 Drawing Sheets

TORQUE CONVERTER WITH TURBINE ONE-WAY CLUTCH

CROSS-REFERENCE TO RELATED APPLICATIONS

This application claims the benefit under 35 U.S.C. §119 (e) of U.S. Provisional Application No. 60/796,477, filed May 1, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a one-way clutch for a turbine in a torque converter. The clutch enables the turbine to transmit torque to a hub for the torque converter during drive mode and to disconnect the turbine from the hub during a coast mode. Specifically, the present invention torque converter can be used with hybrid vehicles to enable the torque converter turbine to be disconnected from a transmission input shaft during regeneration mode.

BACKGROUND OF THE INVENTION

Certain operating conditions may cause the output hub for a torque converter in a vehicle to rotate faster than the turbine for the converter. For example, in coasting mode, engine braking mode, and regeneration mode for a hybrid vehicle, the hub rotates faster than the turbine. The hub and turbine are rotationally connected and the hub causes the turbine to rotate, which unfortunately, causes the torque converter to operate in what can be thought of as a "reverse" mode. In the coasting, engine braking, or regeneration modes, the drive unit for the vehicle is typically idling or even shut off, such that the drive unit is providing nominal torque to the pump. The rotation of the turbine reverses the typical fluid flow patterns in the converter and the turbine "pumps" fluid to the pump. This operation of the turbine is undesirable since the rotation of the turbine heats the oil in the turbine, resulting in excessive heat losses, and in some cases, even damage to the torque converter.

Also, in some modes, such as regeneration mode in a hybrid vehicle, it is desirable, if not necessary, to prevent rotation of the internal combustion engine. Unfortunately, although the "reverse" mode noted above is inefficient, rotating the turbine can transfer some torque to the pump and subsequently to the internal combustion engine. It is known to use clutches or gear arrangements in the transmission to disconnect the input shaft from the torque associated with the regeneration mode, however, such measures increase the cost and complexity of the transmission.

In some cases a direct "reverse" linkage between the vehicle transmission and the vehicle drive unit is desirable. For example, in an engine braking mode, the transmission is linked to the engine to use the inertia of the engine to slow down the transmission and wheels connected to the transmission. In a typical torque converter, the above linkage would be effected by the "reverse" mode noted above, with its attendant disadvantages, such as excessive heat losses.

Thus, there is a long-felt need for a means of controlling the rotational engagement of a turbine and an output hub in a torque converter. Specifically, there is a long-felt need for a means of enabling a transmission input shaft in a torque converter to receive torque downstream from the torque, converter without rotating the turbine in the converter or a means of rotationally disconnecting a turbine and a hub in a torque converter when the hub rotates faster than the turbine.

BRIEF SUMMARY OF THE INVENTION

The present invention broadly comprises a torque converter in a vehicle including a turbine and a one-way clutch. The clutch is rotationally connected to the turbine and rotationally connected to an output hub for the torque converter. The output hub is arranged for direct rotational connection to an input shaft for a transmission in a vehicle and the turbine and the input shaft are arranged to rotate at a same speed in a first rotational direction. The one-way clutch is arranged to rotationally disconnect the hub and the turbine when the hub receives torque from the shaft. The vehicle operates in a mode selected from the group consisting of a coasting mode, an engine braking mode, and a regeneration mode to generate the torque. In some aspects, the turbine and the hub are arranged to rotate only in a single direction or the one-way clutch is a first ratchet one-way clutch.

In some aspects, the vehicle includes a drive unit and the torque converter includes a cover connected to the drive unit and a torque converter clutch arranged to rotationally lock the cover and the turbine. In some aspects, the one-way clutch is a ratchet one-way clutch comprising a first radially disposed segment rotationally connected to the hub and a second radially disposed segment rotationally connected to the turbine and the first and second elements are arranged to lockingly engage.

In some aspects, the vehicle further comprises a drive unit connected to a cover for the torque converter and the torque converter includes a torque converter clutch arranged to rotationally connect the cover and the one-way clutch. In some aspects, the one-way clutch is a ratchet one-way clutch comprising a first radially disposed segment rotationally connected to the torque converter clutch and a second radially disposed segment rotationally connected to the turbine and the first and second segments are arranged to lockingly engage. In some aspects, the first radially disposed segment includes at least one receiving element selected from the group consisting of at least one opening and at least one indentation, the second radially disposed segment includes at least one protrusion, and the at least one receiving element and the at least one protrusion are arranged to lockingly engage. In some aspects, the second radially disposed segment includes at least one receiving element selected from the group consisting of at least one opening and at least one indentation, the first radially disposed segment includes at least one protrusion, and the at least one receiving element and the at least one protrusion are arranged to lockingly engage.

In some aspects, the vehicle further comprises a drive unit supplying torque to the shaft. The torque converter clutch is arranged to transmit the torque to the drive unit connected to the cover to start the drive unit connected to the cover.

In some aspects, the torque converter includes a damper element rotationally connected to the torque converter clutch. In some aspects, the damper element is rotationally connected to the turbine, the one-way clutch, or the hub. The drive unit connected to the cover is arranged to generate a certain torque, the turbine is arranged to multiple the torque, and the one-way clutch is rated to operate under the multiplied torque.

The present invention also broadly comprises a torque converter in a vehicle including a turbine, a ratchet one-way clutch rotationally connected to the turbine and rotationally connected to an output hub, a torque converter clutch, and a damper element rotationally connected to the torque converter clutch. The output hub is arranged for direct rotational connection to an input shaft for a transmission in a vehicle and the turbine and the input shaft are arranged to rotate at a same speed in a first rotational direction. The damper element is rotationally connected to the one-way clutch and the output hub, and the one-way clutch is arranged to rotationally disconnect the turbine from the hub when the hub receives torque from the transmission input shaft. The one-way clutch is arranged to rotationally disconnect the turbine from the hub when the hub rotates at a faster rate than the turbine.

The present invention further broadly comprises a torque converter in a vehicle including a turbine, a ratchet one-way clutch rotationally connected to the turbine and rotationally connected to an output hub for the torque converter, a torque converter clutch, and a damper element rotationally connected to the torque converter clutch and rotationally connected to the turbine. The output hub is arranged for direct rotational connection to an input shaft for a transmission in a vehicle and the turbine and the input shaft are arranged to rotate at a same speed in a first rotational direction. The one-way clutch is arranged to rotationally disconnect the turbine from the hub when the hub rotates at a faster rate than the turbine. The vehicle includes a drive unit, the drive unit is arranged to generate a torque, the turbine is arranged to multiple the torque, and the one-way clutch is rated to operate under the multiplied torque.

It is a general object of the present invention to provide a means of controlling the rotational engagement of a turbine and an output hub in a torque converter.

It is another object of the present invention to provide a means of enabling a transmission input shaft in a torque converter to receive torque downstream from the torque converter without rotating the turbine in the converter.

It is a further object of the present invention to provide a means of rotationally disconnecting a turbine and a hub in a torque converter when the hub rotates faster than the turbine.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

In general, a present invention one-way clutch functions to control the rotational engagement of a turbine in a torque converter with an output hub for the torque converter. Specifically, the one-way clutch acts to rotationally disconnect the turbine and the hub under certain operating conditions. For example, the one-way clutch rotationally disconnects the turbine from the hub when the hub receives torque from the input shaft, in comparison to transmitting torque to the input shaft, or when the hub rotates faster than the turbine. In "normal" operating conditions, for example, in torque conversion mode or in lock-up mode, the clutch operates to rotationally connect the turbine and the hub.

Figure 1:
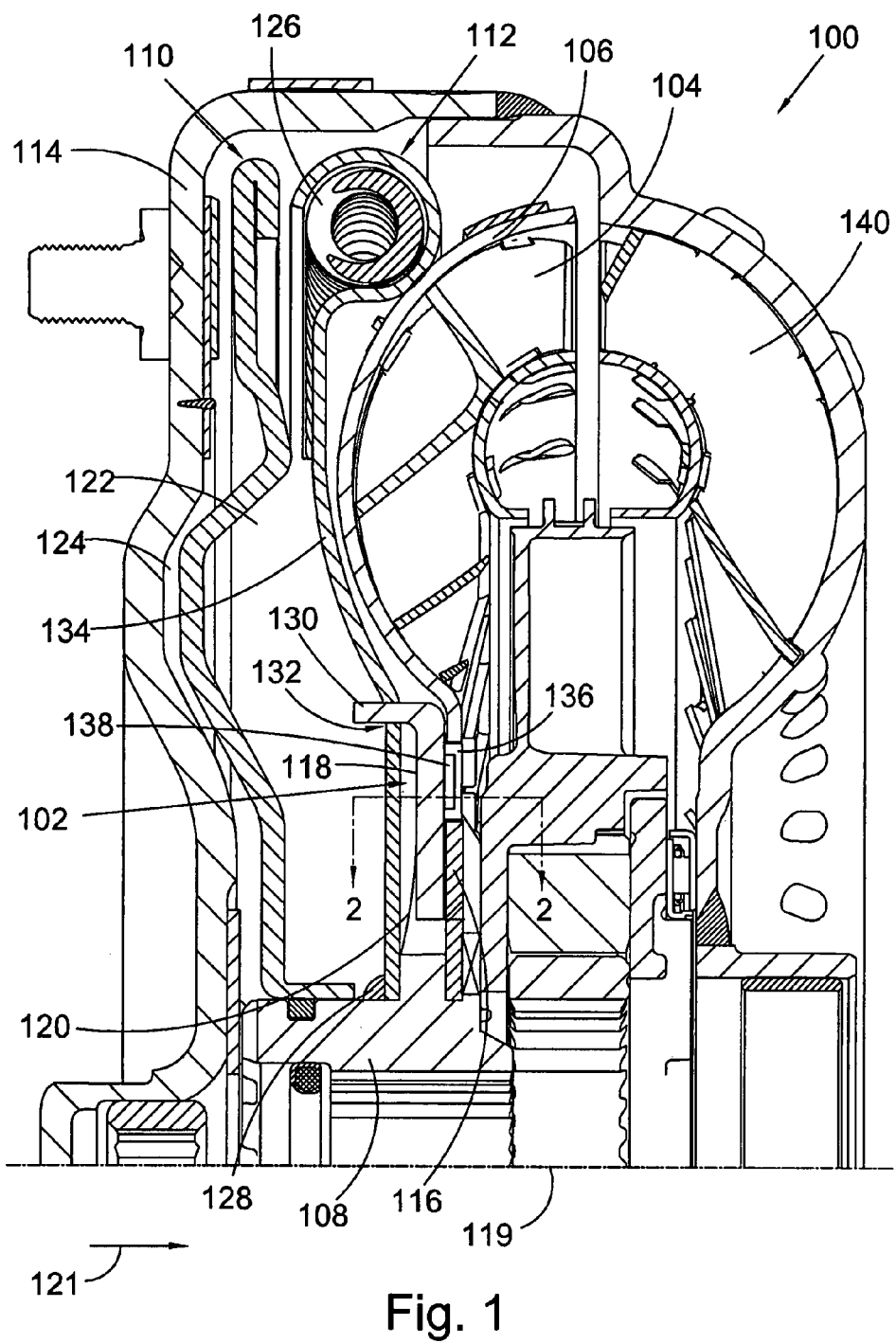
FIG. 1 is a partial cross-sectional view of a present invention torque converter with a one-way clutch for a turbine and a damper element connected to the one-way clutch.

FIG. 1 is a partial cross-sectional view of present invention torque converter 100 with one-way clutch 102 for a turbine and a damper element rotationally connected, or secured, to one-way clutch 102. By rotationally connected, or secured, we mean that the damper element and the clutch are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. In the discussions infra, a connection is assumed to be a rotational connection unless otherwise specified.

Clutch 102 is disposed in torque converter 100. Torque converter 100 is arranged to be installed in a vehicle (not shown). Converter 100 includes turbine 104 with turbine shell 106 and output hub 108 rotationally connected to a transmission input shaft (not shown). In some aspects, hub 108 is directly connected to the input shaft, that is, there are no intermediary components between the hub and the shaft. One-way clutch 102 is arranged to control rotational engagement of turbine 104 and output hub 108. For example, one-way clutch 102 is arranged to rotationally disconnect hub 108 and turbine 104 when the hub receives torque from the input shaft. The hub receives torque from the shaft when a vehicle housing torque converter 100 is operating in modes including, but not limited to, coasting, engine braking, and regeneration, as further discussed infra. When clutch 102 rotationally engages turbine 104 and hub 108, turbine 104 and the input shaft to which the hub is connected rotate at the same speed. That is, there are no intermediary components substantially modifying the rotational speed transmitted from the turbine to the shaft. Turbine 104 and hub 108 are arranged to rotate only in a single direction, for example, the direction of rotation for an engine, or drive unit, (not shown) in the vehicle.

The locking arrangement in clutch 102 can be formed by any means known in the art. In addition, in some aspects, clutch 102 is a ratchet one-way clutch including at least portions of an axially engaging and disengaging one-way clutch mechanism as shown in commonly assigned U.S. patent application Ser. No. 11/480,815, titled "STATOR HAVING AN AXIALLY ENGAGING AND DISENGAGING ONE-WAY CLUTCH MECHANISM FOR A TORQUE CONVERTER," inventors Brees et al., filed Jul. 3, 2006.

Converter 100 also includes torque converter clutch 110, damper element 112, and cover 114. Clutch 110, element 112, and cover 114 can be any type known in the art. The vehicle engine, or drive unit, is connected to cover 114 and provides torque to converter 100. Clutch 102 includes radially disposed segments 116 and 118, or plates 116 and 118. The term "radially disposed segment" refers to a component in the clutch that has at least portions that are substantially disc-like and substantially orthogonal to longitudinal axis 119. Hereinafter, the terms "radially disposed element" and "plate" are used interchangeably. Resiliently deformable element 120 urges plate 118 in direction 121. Plate 116 is rotationally connected to turbine shell 106. Plate 118 is rotationally locked to hub 108, that is, plate 118 is directly or indirectly rotationally connected to the hub such that plate 118 and the hub rotate together.

In some aspects, clutch 110 operates as a typical torque converter clutch or lock-up clutch. That is, when pressure in chamber 122 is greater than pressure in chamber 124, clutch 110 engages cover 114 and transmits torque from the cover to the damper. When pressure in chamber 124 is greater than pressure in chamber 122, clutch 110 is disengaged from cover 114. Clutch 110 is rotationally connected to the damper element. Clutch 110 and element 112 can be rotationally linked using any means known in the art, including axial tabs (not shown) extending from the clutch into the damper element and engaging elastically deformable components 126. Components 126 can be any type known in the art, for example, springs.

Element 112 is rotationally connected to clutch 102 and hub 108. In particular, the element, clutch, and hub rotate at the same speed due to the fixed rotational connection of the three components. Element 112 is connected to the hub by any means known in the art, including, but not limited to weld 128. Element 112 is connected to clutch 102 by any means known in the art. In some aspects, plate 118 includes axial tabs 130, disposed in openings 132 in plate 134 of element 112. Thus, clutch 110 transmits torque through element 112 to clutch 102 and hub 108. The arrangement of tabs 130 and openings 132 enables axial movement of plate 118 with respect to plate 116.

In some aspects (not shown), plates 116 and 118 are each formed separately and connected to shell 106 and plate 134, respectively, by any means known in the art. In some aspects, plates 116 and 118 are formed integrally with shell 106 and plate 134, respectively. For example, plate 116 and shell 106 are formed of a same single piece. In some aspects, plates 116 and 118 are formed with complimentary receiving elements, such as openings or indentations, and protrusions, which are arranged to lockingly engage. For example, plate 116 includes openings 136 and plate 118 includes ramps 138. It should be understood that this configuration can be reversed. For example, plate 116 can include protrusions and plate 118 can include receiving elements. In some aspects (not shown), an intermediate plate, as shown in commonly assigned U.S. patent application Ser. No. 11/480,815, titled "STATOR HAVING AN AXIALLY ENGAGING AND DISENGAGING ONE-WAY CLUTCH MECHANISM FOR A TORQUE CONVERTER," inventors Brees et al., filed Jul. 3, 2006, is axially disposed between plates 116 and 118 to prevent the protrusions from engaging the receiving elements during the free-wheel mode.

Figure 2:
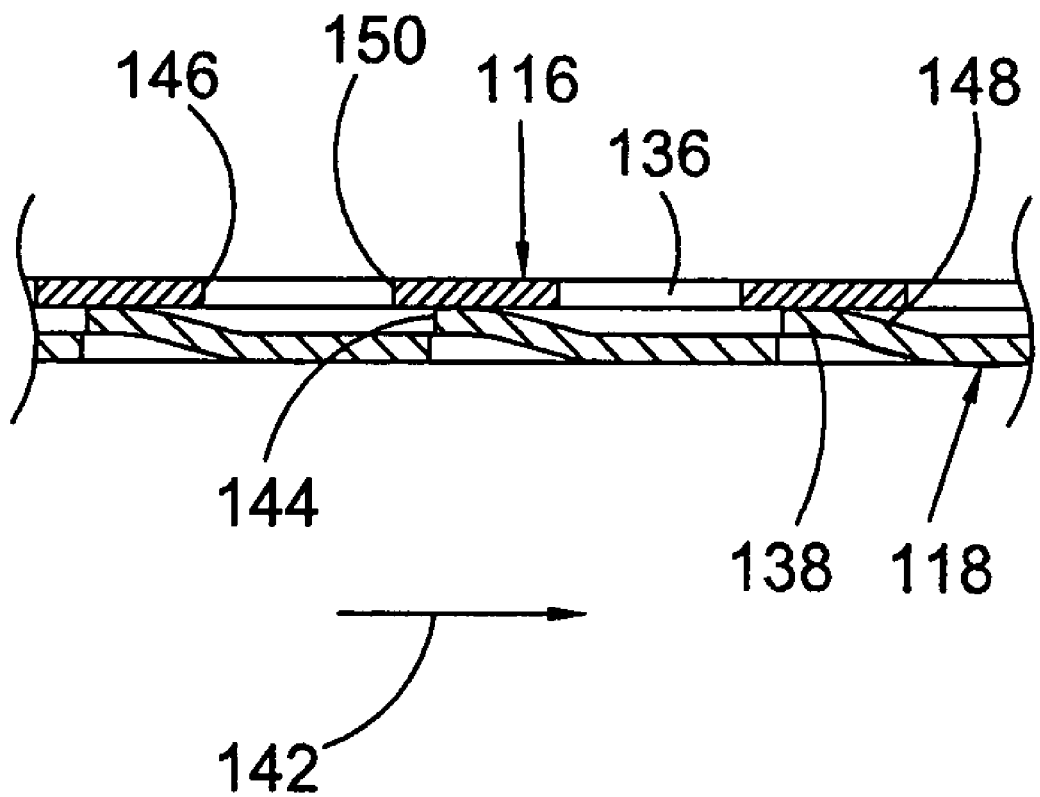
FIG. 2 is a partial cross-sectional view of clutch plates along line 2-2 in FIG. 1; and, FIG. 3 is a partial cross-sectional view of a present invention torque converter with a one-way clutch for a turbine and a damper element connected to the turbine.

FIG. 2 is a partial cross-sectional view of clutch plates along line 2-2 in FIG. 1. The following should be viewed in light of FIGS. 1 and 2. The problems associated with rotationally locking a hub, such as hub 108 and a turbine, such as turbine 104, when the hub is receiving torque from a source downstream of the torque converter were discussed supra. As noted supra, clutch 102 is arranged to rotationally disconnect hub 108 and turbine 104 when the hub receives torque from the input shaft, for example, in coast, engine braking, or regeneration modes. Alternately stated, clutch 102 is arranged to disconnect the hub and the turbine when the hub is rotating faster than the turbine. When the vehicle is in coast, engine braking, or regeneration mode, the engine is typically idling or shut-off. Therefore, little or no torque is transferred to pump 140 through cover 114 and turbine 104 is rotating slowly or not at all. As a result, the torque received by the hub from the input shaft typically causes the hub to rotate faster than the turbine.

Ramps 138 include radial (substantially orthogonal to axis 119) surfaces 144 and openings 136 include sides 146. To lockingly engage plates 116 and 118, when the plates are rotating in direction 142, sides 146 must engage radial surface 144. Then, plate 116 drives or pushes plate 118. This occurs when plate 116 is rotating faster than plate 118. However, when plate 118 is rotating faster than plate 116, sides 146 cannot "catch up" to ramps 138 and clutch 102 operates in a free-wheel mode. That is, hub 108 and turbine 104 are rotationally independent. For example, in free-wheel mode, sloped segments 148 of ramps 138 are "leading." Thus, the sloped segments drop into openings 136, but then slide out over edges 150 without locking with the edges. Thus, plates 116 and 118 do not rotationally lock.

In "normal" operating conditions, such as torque conversion mode or lock-up mode, plate 116 receives torque from shell 106 and rotates faster than plate 118. Therefore, edges 144 and 146 engage and the plates rotationally lock.

Torque converter 100 has particular application to a hybrid vehicle, that is, a vehicle with both an internal combustion engine and an electric motor. When a hybrid vehicle brakes, it is desirable to enter a regeneration mode in which the transmission input shaft is rotated by torque provided by the wheels of the car to operate the electric motor as a generator. With clutch 102, operation in the regeneration mode is possible without inducing rotation of turbine 104. Further, to avoid rotating the internal combustion engine, clutch 110 is opened, rotationally disconnecting hub 108 from cover 114.

The internal combustion engine may be shut off when the hybrid vehicle is operating in regeneration mode. It is desirable to use the electric motor to restart the internal combustion engine. Therefore, in some aspects, clutch 102 can be used to transmit torque provided by the electric motor on the input shaft to the internal combustion engine for purposes of restarting the engine. For example, the electric motor rotates the shaft, which in turn rotates hub 108. Torque from the hub is transmitted through segment 134 to damper 112 and clutch 110. Clutch 110 is closed to transmit the torque to cover 114 and thence to the internal combustion engine. At the same time, clutch 102 rotationally disconnects the hub and turbine 104, preventing losses associated with rotating the turbine. Thus, torque is efficiently provided to the internal combustion engine.

In an engine braking mode, it is desirable to rotationally link the transmission of a vehicle with the engine, that is, to use the inertia of the engine to slow down the wheels connected to the transmission. In this mode, clutch 102 opens to disconnect the hub and the turbine, however, torque from the wheels travels via hub 108, segment 134, and element 112 to clutch 110. Clutch 110 is closed to rotationally lock clutch 110 to the cover and the engine. Thus, there is a direct torque connection from the wheels to the engine.

It should be appreciated that converter 100 is not limited to the configuration shown. For example, plates 116 and 118 are not limited to the size, shape, or configuration shown. Plates 116 and 118 are not limited to a particular number, size, or configuration of receiving elements and protrusions. In like manner, the remaining components in torque converter 100 are not limited to the sizes, shapes, or configurations shown. Components in converter 100 can be formed by any means known in the art. In some aspects, some or all of the plates and hub are stamped.

Figure 3:
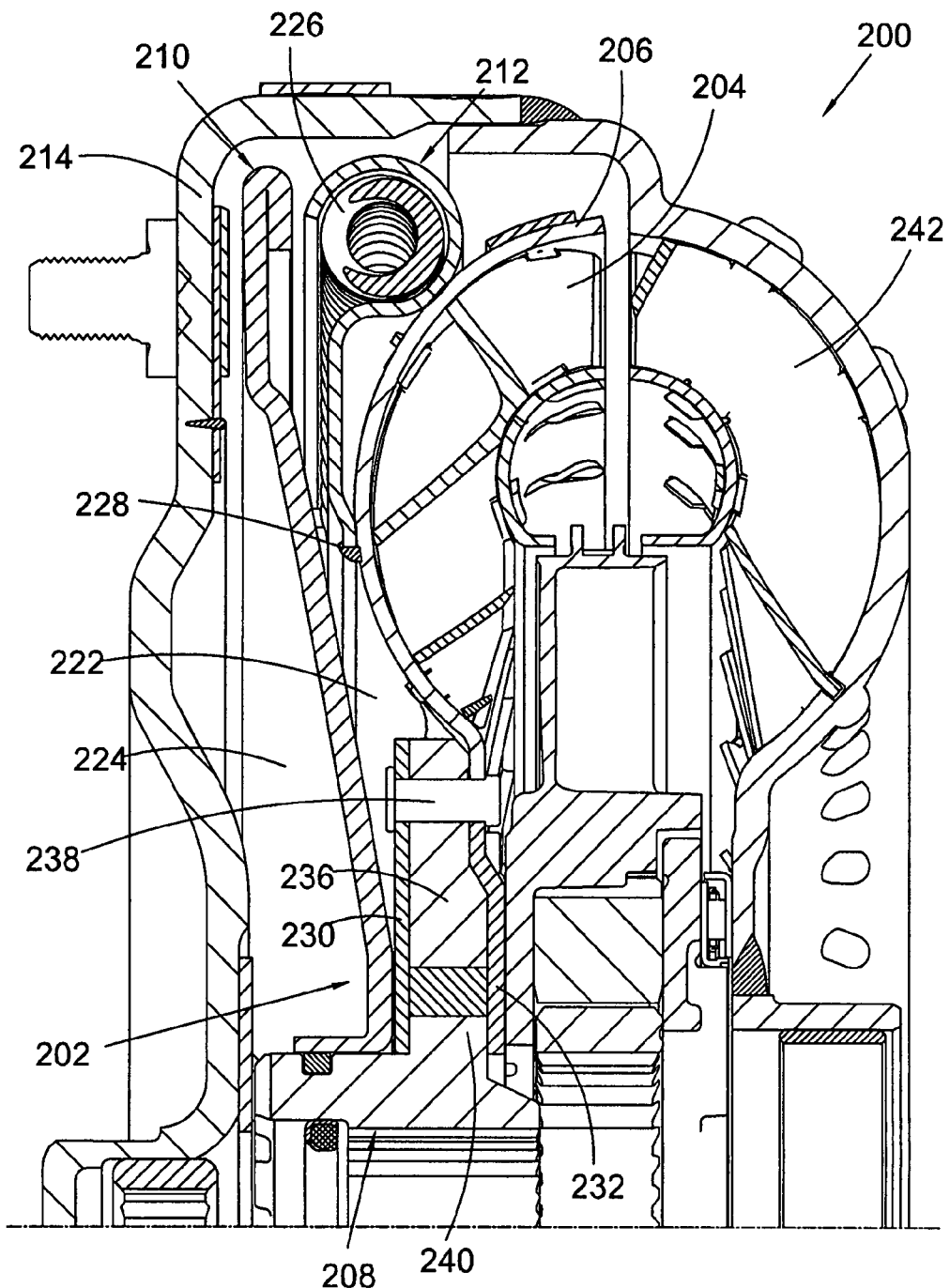

FIG. 3 is a partial cross-sectional view of present invention torque converter 200 with one-way clutch 202 for a turbine and a damper element connected to the turbine. Clutch 202 is disposed in torque converter 200. Torque converter 200 is arranged to be installed in a vehicle (not shown). Converter 200 includes turbine 204 with turbine shell 206 and output hub 208 rotationally connected to a transmission input shaft (not shown). In some aspects, hub 208 is directly connected to the input shaft, that is, there are no intermediary components between the hub and the shaft. One-way clutch 202 is arranged to control rotational engagement of turbine 204 and output hub 208. For example, one-way clutch 202 is arranged to rotationally disconnect hub 208 and turbine 204 when the hub receives torque from the input shaft. The hub can receive torque from the shaft when a vehicle housing torque converter 200 is operating in modes including, but not limited to, coasting and regeneration, as further discussed infra. When clutch 202 rotationally engages turbine 204 and hub 208, turbine 204 and the input shaft to which the hub is connected rotate at the same speed. That is, there are no intermediary components substantially modifying the rotational speed transmitted from the turbine to the shaft. Turbine 204 and hub 208 are arranged to rotate only in a single direction, for example, the direction of rotation for an engine, or drive unit, (not shown) in the vehicle.

The locking arrangement in clutch 202 can be formed by any means known in the art. For example, a roller one-way clutch can be used. In addition, in some aspects (not shown), clutch 202 is a ratchet one-way clutch including at least portions of an axially engaging and disengaging one-way clutch mechanism as shown in commonly assigned U.S. patent application Ser. No. 11/480,815, titled "STATOR HAVING AN AXIALLY ENGAGING AND DISENGAGING ONE-WAY CLUTCH MECHANISM FOR A TORQUE CONVERTER," inventors Brees et al., filed Jul. 3, 2006. For those aspects in which clutch 202 is a ratchet clutch, a first clutch plate is rotationally connected to turbine 204 and a second plate is rotationally connected to hub 208. For example, the first plate is functionally analogous to plate 116 in FIG. 1 and the second plate is functionally analogous to plate 118 in FIG. 1. The discussion in the description of FIG. 1 regarding receiving elements and protrusions in clutch 102 is applicable to those aspects in which clutch 202 is a ratchet clutch.

Converter 200 includes torque converter clutch 210, damper element 212, and cover 214. The engine, or drive unit, in the vehicle is connected to cover 214 and provides torque to converter 200. Clutch 210 operates as a typical torque converter clutch or lock-up clutch. That is, when pressure in chamber 222 is greater than pressure in chamber 224, clutch 210 engages cover 214 and when pressure in chamber 224 is greater than pressure in chamber 222, clutch 210 is disengaged from cover 214. Clutch 210 is rotationally connected to the damper element. Clutch 210 and element 212 can be rotationally linked using any means known in the art, including axial tabs (not shown) extending from the clutch into the damper element and engaging elastically deformable components 226. Components 226 can be any type known in the art, for example, springs.

Element 212 is rotationally connected to shell 206 by any means known in the art, for example, weld 228. In some aspects, relative axial movement between the element and the hub is possible.

Plates 230 and 232 axially contain clutch 202, that is, the clutch is axially disposed and held between the plates. Outer segment 236 of clutch 202 is rotationally secured to shell 206 by any means known in the art, for example, rivet 238. Inner segment 240 of clutch 202 is rotationally connected to hub 208. In some aspects, segment 240 is integral with hub 208. In some aspects (not shown), segment 240 is formed separately from the hub and rotationally secured to the hub using any means known in the art. Thus, segment 236 is rotationally locked with the turbine and segment 240 is rotationally locked with the hub.

The problems associated with rotationally locking a hub, such as hub 208 and a turbine, such as turbine 204, when the hub is receiving torque from a source downstream of the torque converter were discussed supra. As noted supra, clutch 202 is arranged to rotationally disconnect 208 hub and turbine 204 when the hub receives torque from the input shaft, for example, in regeneration mode. Alternately stated, clutch 202 is arranged to disconnect the hub and the turbine when the hub is rotating faster than the turbine.

Torque converter 200 has particular application to a hybrid vehicle, that is, a vehicle with both an internal combustion engine and an electric motor. When a hybrid car brakes, it is desirable to enter a regeneration mode in which the transmission input shaft is rotated by torque provided by the wheels of the car to operate the electric motor as a generator. With clutch 202, operation in the regeneration mode is possible without inducing rotation of turbine 204. Since turbine 204 is rotationally disconnected from the hub, the hub does not rotate pump 242 and consequently, cover 214 and the engine also are not rotated.

It should be appreciated that converter 200 is not limited to the configuration shown. In general, the components in torque converter 200 are not limited to the sizes, shapes, or configurations shown. Components in converter 200 can be formed by any means known in the art. In some aspects, some or all of the plates and hub are stamped.

Returning to FIG. 1, the following discussion is with respect to FIG. 1, however, it should be understood that the discussion is applicable to FIG. 3. In general, a torque converter can multiply the torque provided by an engine connected to the converter. For example, during torque conversion mode, the torque transmitted from the engine through cover 114 and pump 140 is multiplied by a factor of 1.5 or more by turbine 104. Therefore, the torque transmitted to clutch 102 by turbine 104 is greater than the engine torque and the torque bearing requirements of clutch 102 are thereby increased. For example, the torque bearing requirement for clutch 102 must be greater than the torque bearing requirement for a one-way clutch in a stator, which sees only the engine torque. Advantageously, a ratchet clutch has a very robust construction, can be simply and relatively inexpensively made, and is capable of operating under multiplied engine torque.

In some aspects (not shown), a present invention one-way clutch is hydraulically dampened, for example, as described in the commonly assigned U.S. Provisional Patent Application No. 60/796,482 titled "ONE-WAY CLUTCH WITH DAMPENING," inventors William Brees, Christopher Shamie, Philip George, and Jeffrey Hemphill, filed May 1, 2006.

In some aspects (not shown), in which a present invention one-way clutch comprises radially disposed elements axially displaced with each other, for example, returning to FIG. 1, plates 116 and 118, the clutch is mechanically dampened, for example, as described in the commonly assigned U.S. Provisional Patent Application No. 60/796,482 titled "ONE-WAY CLUTCH WITH DAMPENING," inventors William Brees, Christopher Shamie, Philip George, and Jeffrey Hemphill, filed May 1, 2006.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
   a turbine; and,
   a ratchet one-way clutch rotationally connected to said turbine and rotationally connected to an output hub for said torque converter, said output hub arranged for direct rotational connection to an input shaft for a transmission in a vehicle and said turbine and said input shaft arranged to rotate at a same speed in a first rotational direction, wherein said ratchet one-way clutch comprises:
      a first segment having a first surface substantially orthogonal to an axis of rotation for the torque converter and having an axially extending portion at an outer circumference of the first portion, wherein the first segment is rotatable in unison with the hub via a connection with the axially extending portion; and
      a second segment having a second surface substantially orthogonal to the axis of rotation, wherein the second segment is rotationally connected to the turbine at an outer circumference of the second segment, wherein the first and second surfaces are arranged to lockingly engage for rotation in the first direction, and wherein the only radial alignment of the first and second segments is at the first and second surfaces.

2. The torque converter of claim 1 wherein said one-way clutch is arranged to rotationally disconnect said hub and said turbine when said hub receives first torque from said shaft.

3. The torque converter of claim 2 wherein said vehicle operates in a mode selected from the group consisting of a coasting mode, an engine braking mode, and a regeneration mode to generate said first torque.

4. The torque converter of claim 1 wherein said turbine and said hub are arranged to rotate only in said first direction.

5. The torque converter of claim 1 wherein said vehicle further comprises a drive unit; and,
   said torque converter further comprises: a cover connected to said drive unit and a torque converter clutch arranged to rotationally connect said cover and said turbine.

6. The torque converter of claim 1 wherein said vehicle further comprises a first drive unit; and,
   said torque converter further comprising: a cover connected to said drive unit and a torque converter clutch arranged to rotationally connect said cover and said one-way clutch.

7. The torque converter of claim 6 wherein said vehicle further comprises a second drive unit supplying torque to said shaft, and wherein said torque converter clutch is arranged to connect said hub and said cover to transmit said torque to said second drive unit to start said second drive unit.

8. The torque converter of claim 1 further comprising:
   a torque converter clutch; and,
   a damper element rotationally connected to said torque converter clutch.

9. The torque converter of claim 8 wherein said damper element is rotationally connected to said turbine.

10. The torque converter of claim 8 wherein said damper element is rotationally connected to said one-way clutch.

11. The torque converter of claim 8 wherein said damper element is rotationally connected to said hub.

12. The torque converter of claim 1 wherein said vehicle further comprises a drive unit, said drive unit is arranged to generate a torque, said turbine is arranged to multiple said torque, and said one-way clutch is rated to operate under said multiplied torque.

13. A torque converter, comprising:
    a turbine;
    a ratchet one-way clutch including:
       a first segment having a first surface substantially orthogonal to an axis of rotation for the torque converter and having an axially extending portion at an outer circumference of the first portion, wherein the first segment is rotatable in unison with the hub via the axially extending portion; and,
       a second segment having a second surface substantially orthogonal to the axis of rotation, wherein the second segment is rotationally connected to the turbine at an outer circumference of the second segment, wherein the first and second surfaces are arranged to lockingly engage for rotation in a first rotational direction, and wherein the only radial alignment of the first and second segments is at the first and second surfaces;
    a torque converter clutch; and,
    a damper element rotationally connected to said torque converter clutch, wherein said output hub is arranged for direct rotational connection to an input shaft for a transmission in a vehicle, said turbine and said input shaft are arranged to rotate at a same speed in the first rotational direction, said damper element is rotationally connected to said one-way clutch and said output hub, and said one-way clutch is arranged to rotationally disconnect said turbine from said hub when said hub receives torque from said transmission input shaft.

14. The torque converter of claim 13 wherein said one-way clutch is arranged to rotationally disconnect said turbine from said hub when said hub rotates at a faster rate than said turbine.

15. A torque converter, comprising:
    a turbine;
    a ratchet one-way clutch including:
       a first segment having a first surface substantially orthogonal to an axis of rotation for the torque converter and having an axially extending portion at an outer circumference of the first portion, wherein the first segment is rotatable in unison with the hub via the axially extending portion; and
       a second segment having a second surface substantially orthogonal to the axis of rotation, wherein the second segment is rotationally connected to the turbine at an outer circumference of the second segment, wherein the first and second surfaces are arranged to lockingly engage for rotation in a first rotational direction, and wherein the only radial alignment of the first and second segments is at the first and second surfaces;

a torque converter clutch; and, a damper element rotationally connected to said torque converter clutch and rotationally connected to said turbine, wherein said output hub is arranged for direct rotational connection to an input shaft for a transmission in a vehicle, said turbine and said input shaft are arranged to rotate at a same speed in the first rotational direction, and said one-way clutch is arranged to rotationally disconnect said turbine from said hub when said hub rotates at a faster rate than said turbine.

16. The torque converter of claim 15 arranged for installation in a vehicle, wherein said vehicle further comprises a drive unit, said drive unit is arranged to generate a torque, said turbine is arranged to multiple said torque, and said one-way clutch is rated to operate under said multiplied torque.

* * * * *